United States Patent Office 3,557,203
Patented Jan. 19, 1971

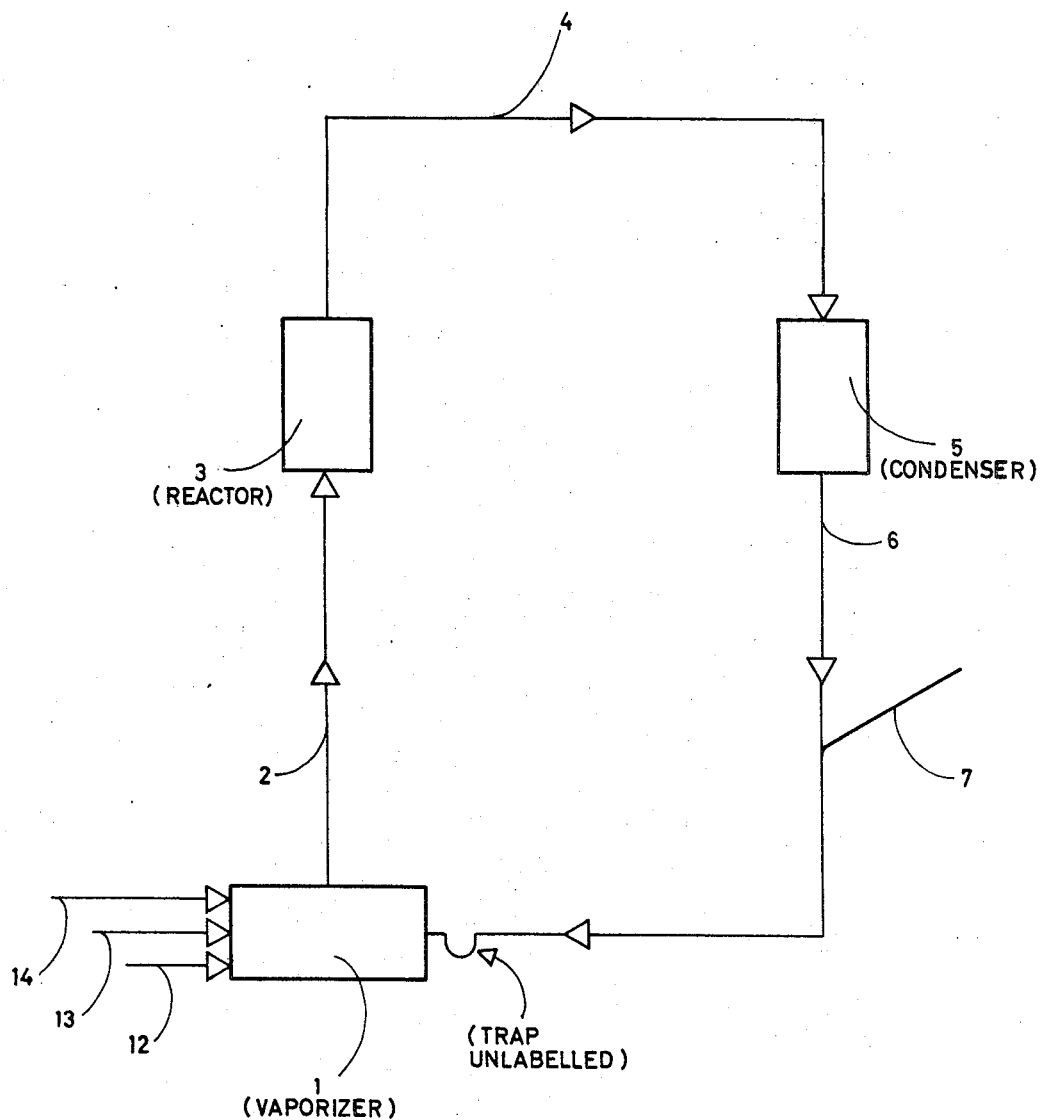

3,557,203
PROCESS FOR PREPARATION OF HALOMETHYL METHYLPHOSPHINIC HALIDES
Eugene H. Uhing, Ridgewood, N.J., assignor to Stauffer Chemical Company, New York, N.Y., a corporation of Delaware
Filed July 6, 1967, Ser. No. 651,525
Int. Cl. C07f 9/52
U.S. Cl. 260—543                4 Claims

ABSTRACT OF THE DISCLOSURE

Process for preparing halomethyl methylphosphinic halides of the formula:

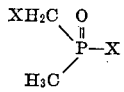

wherein X is a halogen having an atomic weight greater than 30 but less than 85, which process comprises reacting a phosphorus trihalide of the formula:

$$PX_3$$

wherein X is as previously defined, and dimethyl ether in a nonoxidizing medium and recovering the the halomethyl methylphosphonic halide product.

---

This invention relates to a process for preparing halomethyl methylphosphinic halides. More particularly, the present invention relates to the preparation of halomethyl methylphosphinic halides by the high temperature reaction between a phosphorus trihalide and dimethyl ether. Representative examples of phosphorus trihalides are phosphorus trichloride and phosphorus tribromide.

By the process of the invention, halomethyl methylphosphinic halides are prepared by vaporizing the phosphorus trihalide and dimethyl ether reactants and subjecting their vapors to a pyrolyzing temperature for a brief period. The pyrolysis products are then separated by fractional condensation or distillation. The temperature of the reaction is maintained between about 400° C. and 750° C., and preferably between about 550° C. and 650° C. At the preferred temperature range, the product is recovered in good yield with minimal decomposition. The halomethyl methylphosphinic halides are known compounds and are useful as intermediates in the preparation of a variety of products such as, for example, flameproofing, chelating, and metal treating agents, solvent extractants for rare earths, as well as plasticizers, stabilizers, and agricultural chemicals.

A typical flow diagram for the preparation of halomethyl methylphosphinic halides is illustrated by the figure. The process can be carried out with reference to the illustrated diagram as follows:

A quantity of an inert gas is introduced through conduit 13 to vaporizer 1 to rid the system of oxygen as the reaction must be conducted in a non-oxidizing medium. A quantity of phosphorus trihalide is then introduced through conduit 12. The dimethyl ether is introduced continuously as a gas through conduit 14 into vaporizer 1. The mixture is brought to a refluxing temperature whereupon the vapors pass through conduit 2 into reactor 3. There they are heated to a temperature sufficient to effect pyrolysis. The emitted vapors are then passed through conduit 4 to condenser 5. The condensate comprising halomethyl methylphosphinic halide reaction product, starting materials, and by-products, is passed through conduit 6 and returned to vaporizer 1. The gaseous vapors leaving condenser 5 comprising hydrogen chloride and unreacted dimethyl ether are passed through conduit 7 to be recovered or discarded. Halomethyl methylphosphinic halide product can then be drained off from vaporizer 1 or the reaction can be terminated in order to recover the product which can be purified if desired by fractional distillation or other conventional means.

The temperature of the reaction is not critical within the limits established but is generally maintained between about 400° C. and 750° C., and preferably between about 550° C. and 650° C. depending upon the nature of the reactants employed. For example with phosphorus trichloride and dimethyl ether, it is preferred to maintain the temperature of the reaction between about 550° C. and about 650° C., in order to have a reasonably fast reaction without excessive decomposition. It is preferred to use an excess of phosphorus trihalide which serves as a reaction medium but the ratio of reactants is not critical and can be between about .1:1 to 10:1. The reaction is conducted under non-oxidizing conditions, such as in the presence of a dry, inert gas such as nitrogen.

The following example will serve to illustrate the process.

EXAMPLE

To a 3-necked 500 milliliter reaction flask contained in a heating mantle and fitted with a 1" diameter, 3' long Vycor tube having a sliding thermocouple inserted therein, 12" of said Vycor tube contained within an electric furnace, is charged 137 grams of phosphorus trichloride. The phosphorus trichloride is then brought to reflux, the vapors passing into the Vycor tube at a temperature of 550° C. as measured in the Vycor tube. Dimethyl ether (gas) is then added at a rate of 40 cubic centimeters per minute. The reaction is conducted continuously for 10 hours under nitrogen as hereinabove described. Recovery of the chloromethyl methylphosphinic chloride is accomplished by fractionating the reaction mixture to produce a product having an analysis of 20.5% P, 47.3% Cl, and 24.6% ionic Cl as compared to 21.1% P, 48.2% Cl, and 24.1% ionic Cl, theoretical, for a yield of 70% based on the dimethyl ether added. The product is further indicated to be chloromethyl methylphosphinic chloride by its nuclear magnetic resonance spectra. The index of refraction and boiling point range are as follows: $N_D^{25}=1.4941$; B.P. at 0.3 millimeter of mercury=79–81° C.

What is claimed is:
1. A process for preparing halomethyl methylphosphinic halides of the formula:

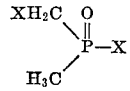

wherein X is a halogen having an atomic weight greater than 30 but less than 85, which process comprises reacting a phosphorus trihalide of the formula:

$$PX_3$$

wherein X is as previously defined, and dimethyl ether at a temperature of between about 400° C. and about 750°

C., in a non-oxidizing medium and recovering the halomethyl methylphosphinic halide product.

2. The process of claim 1 wherein the phosphorus trihalide and dimethyl ether reactants are present in a molar ratio of about 0.1:1.0 to 10.0:1.0.

3. The process of claim 1 wherein the phosphorus trihalide is phosphorus trichloride.

4. The process of claim 1 wherein the phosphorus trihalide is phosphorus trichloride and the temperature of the reaction is maintained between about 550° C. and 650° C.

References Cited

Soborovskii et al.: Chemical Abstracts, vol. 44 (1950), pp. 140lh and i.

Hurd: The Pyrolysis of Carbon Compounds (1929), Chemical Catalog Co., p. 198.

LORRAINE A. WEINBERGER, Primary Examiner

E. J. GLEIMAN, Assistant Examiner